US010913600B2

(12) United States Patent
Vengadam et al.

(10) Patent No.: US 10,913,600 B2
(45) Date of Patent: Feb. 9, 2021

(54) PALLET STORAGE SYSTEMS

(71) Applicant: Target Brands, Inc., Minneapolis, MN (US)

(72) Inventors: Ravi Vengadam, Minneapolis, MN (US); Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 43 days.

(21) Appl. No.: 16/287,091

(22) Filed: Feb. 27, 2019

(65) Prior Publication Data
US 2020/0270057 A1  Aug. 27, 2020

(51) Int. Cl.
*B65G 1/04* (2006.01)
*B65G 37/02* (2006.01)
*B65G 1/02* (2006.01)

(52) U.S. Cl.
CPC .......... *B65G 1/04* (2013.01); *B65G 1/02* (2013.01); *B65G 1/0478* (2013.01); *B65G 37/02* (2013.01); *B65G 2201/0267* (2013.01)

(58) Field of Classification Search
CPC ...... B65G 1/04; B65G 1/0478; B65G 1/0492; B65G 1/16; B65G 1/023; B65G 37/02; B65G 2201/0267; B65G 1/02
See application file for complete search history.

(56) References Cited

U.S. PATENT DOCUMENTS

| | | | | |
|---|---|---|---|---|
| 6,602,037 B2* | 8/2003 | Winkler | ................ | B65G 1/023 |
| | | | | 414/273 |
| 7,591,630 B2* | 9/2009 | Lert, Jr. | ............... | B65G 1/0492 |
| | | | | 414/807 |
| 9,139,363 B2* | 9/2015 | Lert | .................... | B65G 1/0492 |
| 10,358,288 B2* | 7/2019 | Hansl | ................. | B65G 1/1373 |
| 2011/0262253 A1* | 10/2011 | Krizmanic | ............. | B60L 53/20 |
| | | | | 414/279 |
| 2016/0236869 A1* | 8/2016 | Kimura | ................ | G05D 1/0291 |
| 2016/0355339 A1* | 12/2016 | Peng | .................... | B65G 1/0485 |
| 2018/0050870 A1* | 2/2018 | Mathi | ................. | B65G 1/0492 |
| 2019/0047788 A1* | 2/2019 | Winkler | .............. | B65G 1/0492 |

OTHER PUBLICATIONS

Cisco-Eagle.com [online], "Fishbone Design Warehouse Aisles," 2019, [retreived on Feb. 27, 2019], retreived from: <http://www.cisco-eagle.com/catalog/category/3050/fishbone-rack-aisle-layout>, 11 pages.
Cisco-Eagle.com [online], "Pallet Flow Rack Storage Systems," 2019, [retreived on Feb. 27, 2019], retreived from: <http://http://www.cisco-eagle.com/catalog/category/3043/pallet-flow-racks>, 12 pages.
Gue & Meller, "Aisle Configurations for Unit-Load Warehouses," Jan. 8, 2008, retrieved from: <https://kevingue.files.wordpress.com/2012/02/aisles-iie-v3.pdf>, 28 pages.

* cited by examiner

Primary Examiner — Gene O Crawford
Assistant Examiner — Keith R Campbell
(74) Attorney, Agent, or Firm — Fish & Richardson P.C.

(57) ABSTRACT

Systems and methods for enhancing efficiencies of dense pallet storage systems are described. For example, this document describes systems and methods for enhancing efficiencies of dense pallet storage systems by arranging pallet flow racking to define a high variety of lane lengths and non-orthogonal aisles.

19 Claims, 7 Drawing Sheets

PALLET STORAGE SYSTEMS

This document relates to systems and methods for enhancing efficiencies of dense pallet storage systems. For example, this document relates to systems and methods for enhancing efficiencies of dense pallet storage systems by arranging pallet flow racking to define a high variety of lane lengths and non-orthogonal aisles.

BACKGROUND

Consumer demand continues to drive product SKU proliferation, faster order-to-shipment cycle times, and a variety of packaging options, resulting in increased inventory storage challenges for many companies. As the fast-changing market evolves, the need for companies to be efficient, flexible, and scalable is important to achieve operational success.

In order to maximize warehouse storage and throughput capacity using available floor space, while striving for the highest throughput capabilities, manufacturers and distributors are searching for cost effective, reliable ways to be more productive within their operational footprint. The use of various types of pallet flow rack systems (e.g., gravity, drive-through, shuttles, pushback, etc.) is one technique for increasing the density of warehouse storage, and for increasing the efficiency of inventory retrieval processes.

SUMMARY

This document describes systems and methods for enhancing efficiencies of dense pallet storage systems. For example, this document describes systems and methods for enhancing efficiencies of dense pallet storage systems by arranging pallet flow racking to define a high variety of lane lengths and non-orthogonal aisles.

In one aspect, this disclosure is directed to a pallet flow rack storage system. In some embodiments, the system includes two or more groups of pallet flow racks. A perimeter of a first group of pallet flow racks of the two or more groups of pallet flow racks has a non-rectangular shape.

Such a pallet flow rack storage system may optionally include one or more of the following features. The non-rectangular shape may be trapezoidal. The non-rectangular shape may be triangular. An overall outer perimeter of the two or more groups of pallet flow racks in combination may be a rectangular shape. In some embodiments, a first aisle defined between a first pair of adjacent groups of pallet flow racks of the two or more groups of pallet flow racks extends nonparallel and non-orthogonal to the rectangular shape of the overall outer perimeter. In particular embodiments, a second aisle defined between a second pair of adjacent groups of pallet flow racks of the two or more groups of pallet flow racks extends nonparallel and non-orthogonal to the rectangular shape of the overall outer perimeter. A perimeter of a second group of pallet flow racks of the two or more groups of pallet flow racks may have a non-rectangular shape. A perimeter of a third group of pallet flow racks of the two or more groups of pallet flow racks may have a non-rectangular shape. A perimeter of a fourth group of pallet flow racks of the two or more groups of pallet flow racks may have a non-rectangular shape. In some embodiments, the perimeter of each of the first, second, third, and fourth groups is triangular. In some embodiments, two cross aisles are defined between the first, second, third, and fourth groups, and each of the two cross aisles may extend non-parallel and non-orthogonal to a rectangular shape of the overall outer perimeter of the first, second, third, and fourth groups in combination. A third cross aisle may be defined between the first, second, third, and fourth groups, and the third cross aisle may extend parallel and orthogonal to the rectangular shape of the overall outer perimeter of the first, second, third, and fourth groups in combination.

In another aspect, this disclosure is directed to a method of storing multiple types of materials in a pallet flow rack storage system. The pallet flow rack storage system may include two or more groups of pallet flow racks. A perimeter of a first group of pallet flow racks of the two or more groups of pallet flow racks may have a non-rectangular shape, The method includes storing a first type of material in a first pallet lane of the first group of pallet flow racks; and storing a second type of material in a second pallet lane of the first group of pallet flow racks that is longer than the first pallet lane.

Such a method for storing multiple types of materials in a pallet flow rack storage system may optionally include one or more of the following features. In some embodiments, storage volume requirements of the second type of material are greater than storage volume requirements of the first type of material. A pallet flow direction of the first group of pallet flow racks may differ from a pallet flow direction of at least one other group of pallet flow racks of the two or more groups of pallet flow racks. In some embodiments, a perimeter of a second group of pallet flow racks of the two or more groups of pallet flow racks has a second non-rectangular shape. The first non-rectangular shape may differ from the second non-rectangular shape. The first non-rectangular shape may be a triangle and the second non-rectangular shape may be a quadrilateral. In some embodiments, the first and second groups of pallet flow racks have a same flow direction. In particular embodiments, the first and second groups of pallet flow racks have differing flow directions.

The systems and processes described here may be used to provide one or more of the following optional benefits. First, some embodiments described herein provide an inventory storage and retrieval process that is more efficient, responsive, and agile so orders can be shipped to internal and external customers in a shorter timeframe and at a lower cost than current processes. Such results can be accomplished, for example, by using pallet flow racks while matching SKU inventory storage requirements with suitable lane lengths. In such storage systems, the utilization of the storage space within each of the lanes of the pallet flow racks can be increased to high levels. Accordingly, the overall square footage requirements for storage is decreased, and the cost per pallet stored is also decreased. Second, some embodiments described herein provide an inventory storage and retrieval process that facilitates efficient movement of goods by lessening travel distances and times within the warehouse for stowing and retrieving pallets. Accordingly, labor costs can be reduced, and orders can be picked faster using the systems and methods described herein. Third, some embodiments provided herein facilitate long-term flexible warehousing solutions for changing inventory profiles of SKU inventory storage requirements.

Other features, aspects and potential advantages will be apparent from the accompanying description and figures.

DESCRIPTION OF DRAWINGS

Like reference symbols in the various drawings indicate like elements.

DETAILED DESCRIPTION

This document describes systems and methods for enhancing efficiencies of dense pallet storage systems. In some embodiments, the systems described herein can provide an inventory storage and retrieval process that is more efficient, responsive, and agile so orders can be shipped to internal and external customers in a shorter timeframe and at a lower cost than current processes. For example, this document describes systems and methods for enhancing efficiencies of dense pallet storage systems by arranging pallet flow racking to define a high variety of lane lengths and non-orthogonal aisles.

Figure 1:
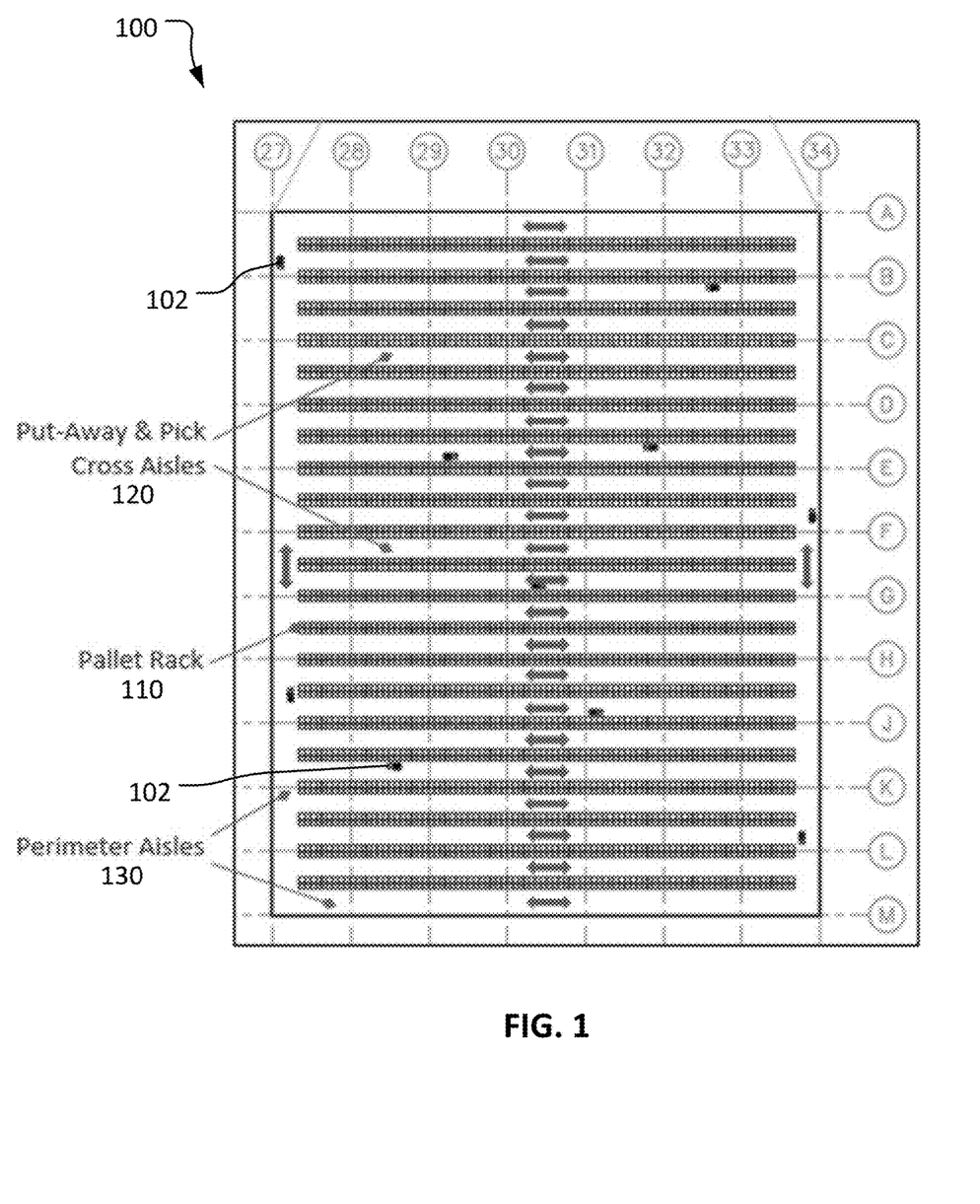
FIG. 1 is a schematic diagram showing an example arrangement of standard pallet racking within a warehouse.

FIG. 1 is a schematic plan view of an example pallet storage arrangement 100 that can be located within a warehouse or portion of a warehouse. While the term "warehouse" is used herein, it should be understood that the example pallet storage arrangement 100 (and the other pallet storage arrangements described herein) can be used in any type of suitable facility such as, but not limited to, flow centers, distribution centers, inventory storing locations, order fulfillment centers, receive centers, stores, cross-docking facilities, material handling facilities, and the like, and combinations thereof.

The pallet storage arrangement 100 is comprised of standard pallet racks which define static pallet storage locations arranged in a multiple level array of back-to-back pallet racks 110. The back-to-back pallet racks 110 are arranged to define multiple cross aisles 120 by which each of the pallet storage locations can be directly accessed for stowing and/or retrieving pallets. The multiple cross aisles 120 are used for travel space by material handling vehicles 102 (e.g., fork lifts, pallet trucks, AGVs, order pickers, and the like) such that the material handling vehicles 102 can transport pallets within the pallet storage arrangement 100. There are also perimeter aisles 130 that allow for travel of the material handling vehicles 102.

As can be seen in FIG. 1, the pallet storage arrangement 100 is not a very dense storage arrangement. That is, the cross aisles 120 and the perimeter aisles 130 consume a large portion of the footprint of the pallet storage arrangement 100. In fact, in some cases about 65% of the footprint of the pallet storage arrangement 100 is taken up by the cross aisles 120 and the perimeter aisles 130. Said another way, the ratio of storage to aisle footprint can be about 1 to 2 in some cases.

Figure 2:
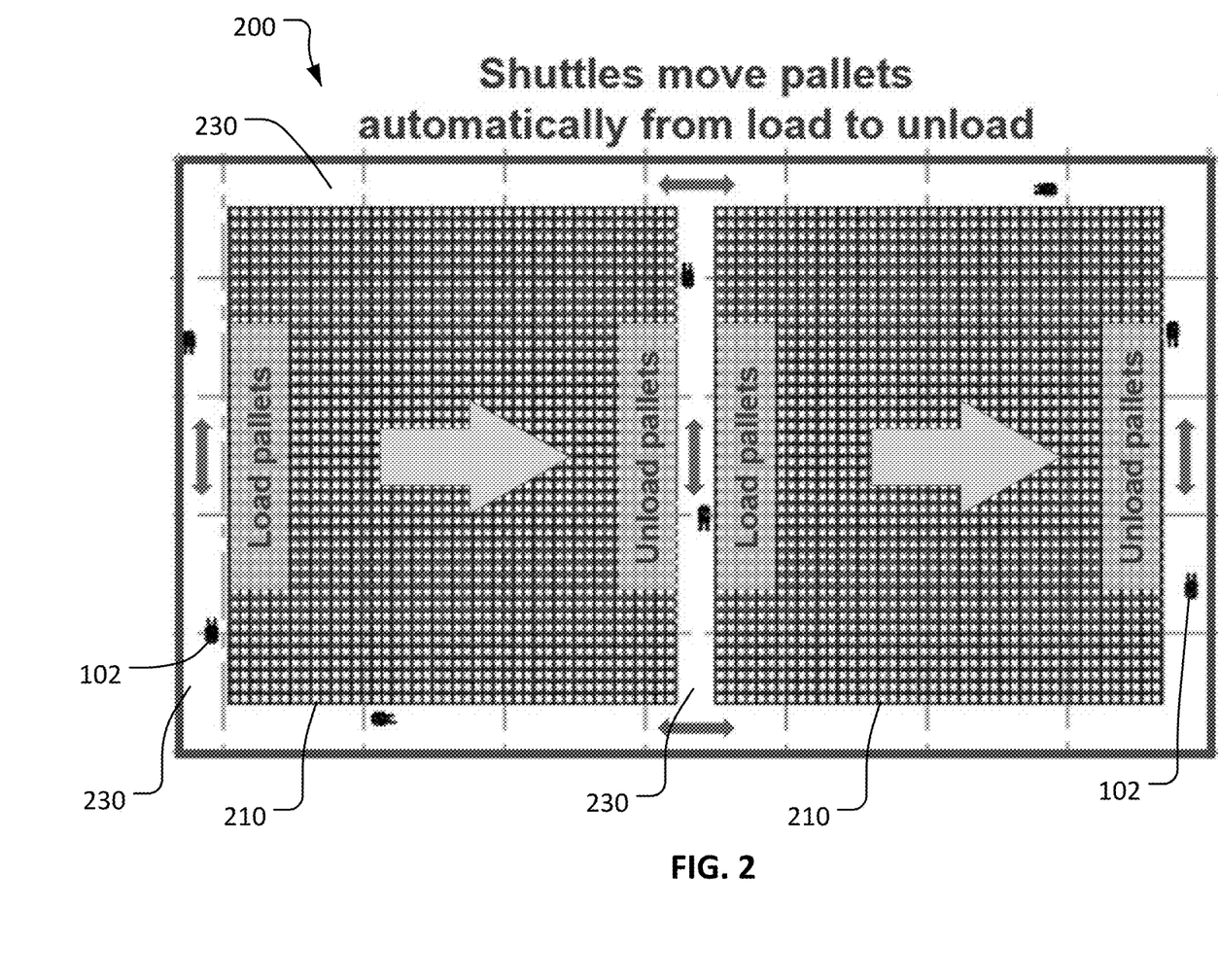
FIG. 2 is a schematic diagram showing an example arrangement of pallet flow rack in accordance with some embodiments.

FIG. 2 is a schematic plan view of an example pallet flow rack storage system 200 that can be located within a warehouse or portion of a warehouse. The example pallet flow rack storage system 200 includes two rectangular arrays of pallet flow racks 210. In some embodiments, the pallet flow racks 210 have multiple vertical levels of pallet storage. The example pallet flow rack storage system 200 (and other pallet flow rack systems described herein) represents various types of pallet storage systems including, but not limited to, Pallet-In Pallet-Out (PIPO) storage systems using shuttles, drive-through systems, drive-in systems, and the like.

Perimeter aisles 230 extend around at least some of the sides of the pallet flow racks 210. The perimeter aisles 230 are used for travel space by the material handling vehicles 102 so that the material handling vehicles 102 can load pallets into the pallet flow racks 210 (on the left end of the pallet flow racks 210 in FIG. 2), unload pallets from the pallet flow racks 210 (on the right end of the pallet flow racks 210 in FIG. 2), and transport pallets around the pallet flow racks 210.

The pallet flow racks 210 are different from the back-to-back pallet racks 110 shown in FIG. 1 in at least the following ways. While the back-to-back pallet racks 110 provide static storage locations arranged in an array that defines aisles by which each of the locations can be directly accessed, the pallet flow racks 210 have multiple flow lanes that are all adjacent to each other, side-by-side such that there are no aisles between the pallet flow racks 210. The pallets stored in the pallet flow racks 210 move (from left to right in the example of FIG. 2), e.g., via shuttles (or gravity if the lanes are short enough), from a loading end of each lane to an unloading end of each lane.

The pallet flow racks 210 advantageously allow for much greater storage density than the back-to-back pallet racks 110 shown in FIG. 1. In some cases, the footprint of the pallet flow racks 210 is about a 51% reduction in comparison to the back-to-back pallet racks 110. However, because each lane of the pallet flow rack 210 is typically populated with a single SKU, some lanes of the pallet flow rack 210 will tend to be underutilized because the optimum carrying inventory quantity of some SKU's will be less than what the lane can contain. Hence, some lanes will tend to not be filled. Additionally, travel distances and times incurred by the material handling vehicles 102 may tend to be extensive because there are no aisles within the rectangular arrangement of the pallet flow racks 210.

Figure 3:
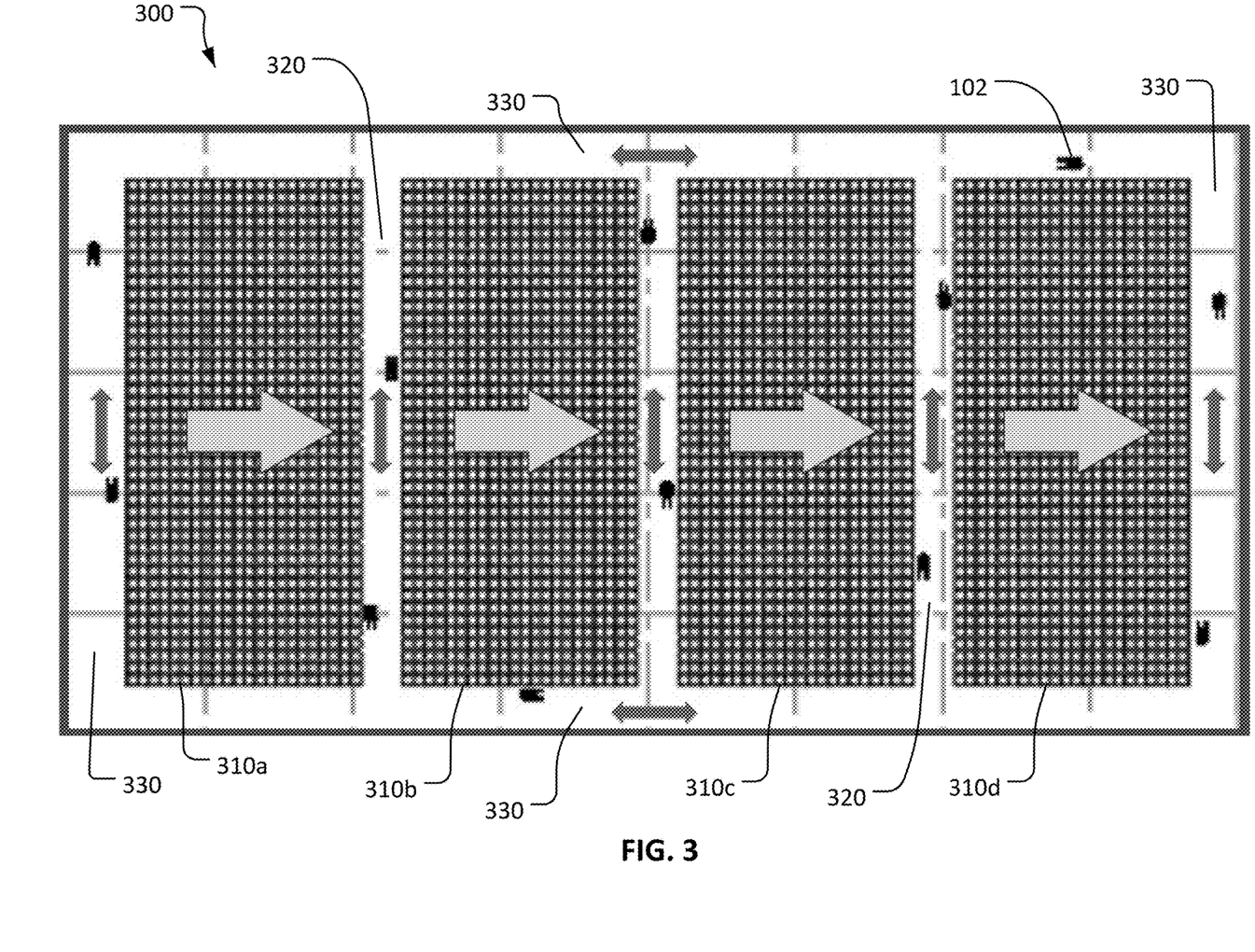
FIG. 3 is a schematic diagram showing another example arrangement of pallet flow rack in accordance with some embodiments.

FIG. 3 is a schematic plan view of another example pallet flow rack storage system 300 that can be located within a warehouse or portion of a warehouse. The pallet flow rack storage system 300 includes multiple rectangular arrays of pallet flow racks 310a, 310b, 310c, and 310d. In some embodiments, the pallet flow racks 310a-d have multiple vertical levels of pallet storage. The pallet flow racks 310a-d each have multiple lanes that flow from left to right in the depicted example.

The arrangement of the pallet flow racks 310a-d are different from the arrangement of the pallet flow racks 210 of FIG. 2 in that the multiple rectangular arrays of pallet flow racks 310a-d define multiple cross aisles 320 (three cross aisles 320 in this example). The cross aisles 320 extend orthogonally and/or parallel in relation to the perimeter aisles 330. This arrangement of the multiple rectangular arrays of pallet flow racks 310a-d can help to reduce the underutilization of pallet lanes and helps to reduce travel distances/times in comparison to the rectangular array(s) of pallet flow racks 210.

Figure 4:
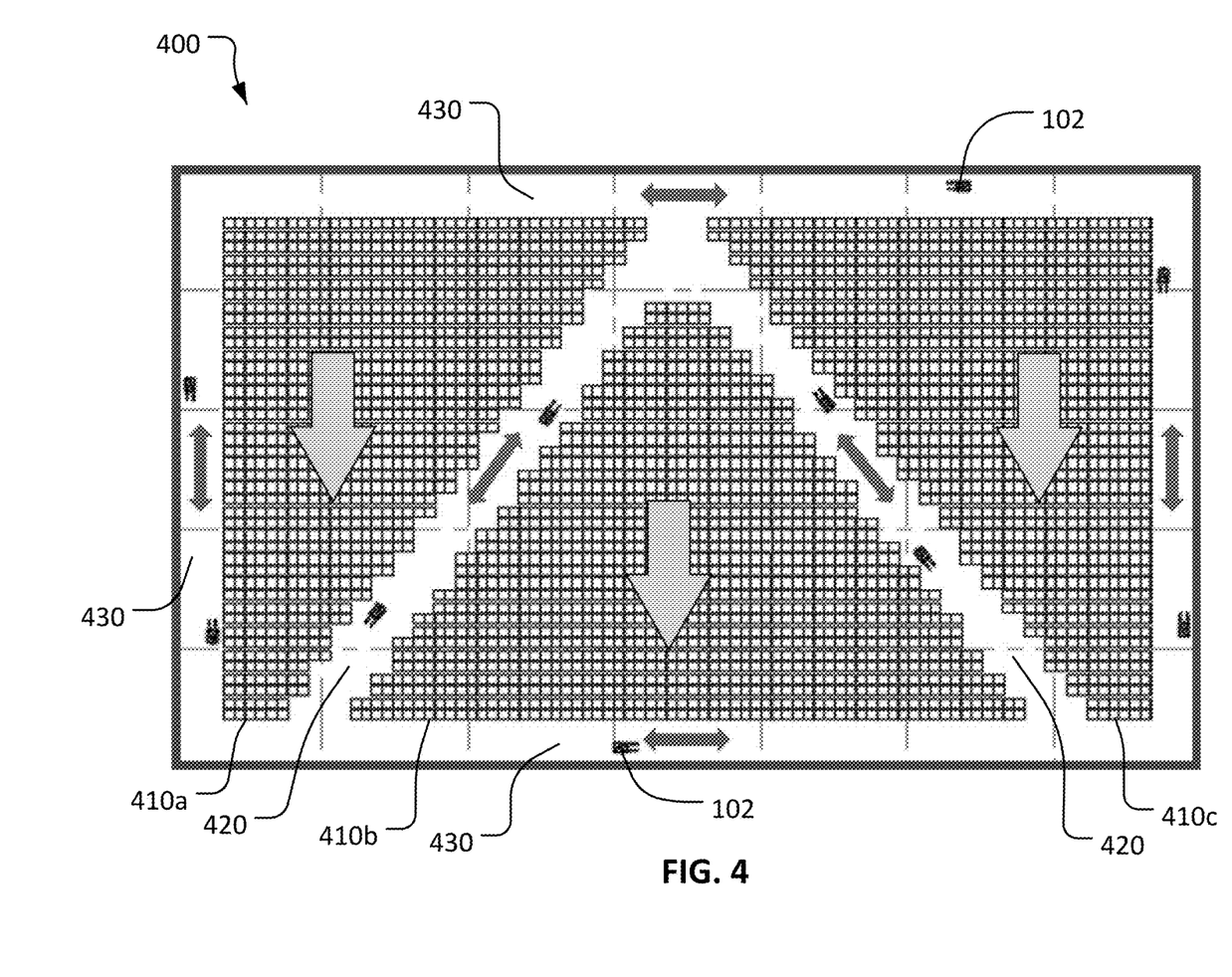
FIG. 4 is a schematic diagram showing another example arrangement of pallet flow rack in accordance with some embodiments.

FIG. 4 is a schematic plan view of another example pallet flow rack storage system 400 that can be located within a warehouse or portion of a warehouse. The pallet flow rack storage system 400 includes multiple non-rectangular groupings of pallet flow racks 410a, 410b, and 410c. In this disclosure, the term "non-rectangular" grouping of pallet flow racks refers to a shape of the outer perimeter of the grouping of pallet flow racks when viewed from above (e.g., as depicted in FIG. 4). In some embodiments, the groupings of pallet flow racks 410a-c have multiple vertical levels of pallet storage. The groupings of pallet flow racks 410a-c each have multiple lanes that flow from left to right in the depicted example.

Instead of being arranged in one or more rectangular groups like pallet flow racks 210 and 310a-d, the groupings of pallet flow racks 410a and 410c are essentially arranged as trapezoidal arrays, and the pallet flow rack 410b is essentially arranged as a triangular array. Accordingly, the groupings of pallet flow racks 410a-c each include a wide variety of pallet lane lengths (e.g., a full spectrum of short pallet lanes to long pallet lanes). For example, the pallet flow rack 410b includes a shortest pallet lane of about two pallet locations, and a longest pallet lane of about 42 pallet locations (a ratio of about 1:21). It should be understood that the example pallet flow rack storage system 400 is scalable to any desired size and ratio of pallet lane lengths.

The arrangement of non-rectangular arrays of groupings of pallet flow racks 410a-c also results in creating one or more cross aisles 420 (two cross aisles 420 in this example) that extend non-orthogonally and/or nonparallel in relation to the perimeter aisles 430.

The pallet flow rack storage system 400, with its multiple non-rectangular groups of pallet flow racks 410a-c, can have at least the following advantages over the rectangular groups of pallet flow racks as exemplified in FIGS. 2 and 3. First, the wide variety of pallet lanes of differing lengths of the pallet flow rack storage system 400 can be efficiently matched up with SKU's that have optimum inventory carrying quantities that closely correlate to the storage capacity of each pallet lane. Accordingly, the entire arrangement of the groupings of pallet flow racks 410a-c can tend to be densely filled and the warehouse space can thereby be highly utilized. Second, the diagonal cross aisles 420 can serve to reduce the travel distances and times that are required to perform pallet stowing and pallet retrieval operations by the material handling vehicles 102.

Figure 5:
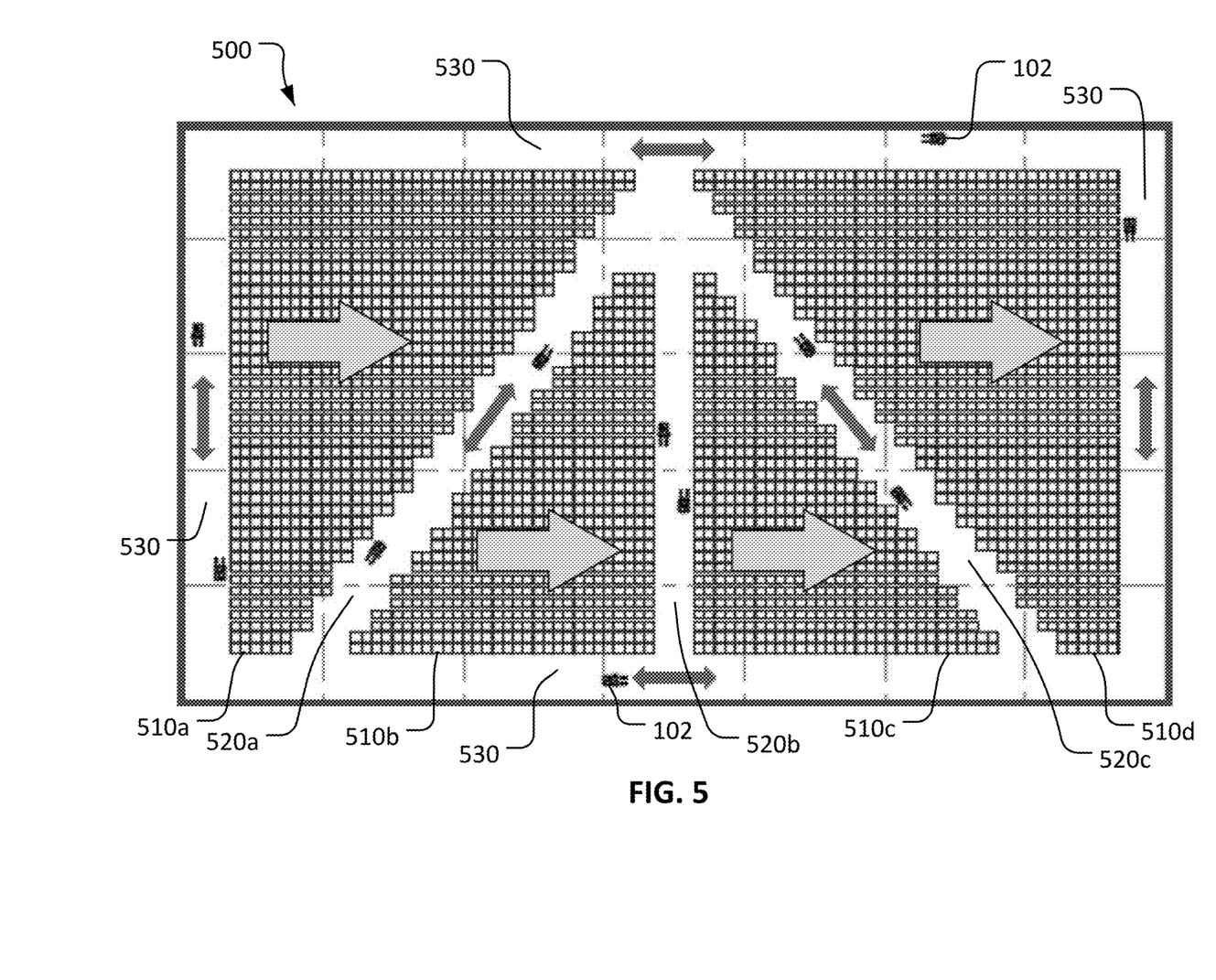
FIG. 5 is a schematic diagram showing another example arrangement of pallet flow rack in accordance with some embodiments.

FIG. 5 is a schematic plan view of another example pallet flow rack storage system 500 that can be located within a warehouse or portion of a warehouse. The pallet flow rack storage system 500 includes multiple non-rectangular groupings of pallet flow racks 510a, 510b, 510c, and 510d. In some embodiments, the groupings of pallet flow racks 510a-d have multiple vertical levels of pallet storage. The groupings of pallet flow racks 510a-d each have multiple lanes that flow from left to right in the depicted example.

Instead of being arranged in one or more rectangular groups like pallet flow racks 210 and 310a-d, the groupings of pallet flow racks 510a and 510d are essentially arranged as trapezoidal arrays, and the groupings of pallet flow racks 510b and 510c are essentially arranged as triangular arrays. Accordingly, the groupings of pallet flow racks 510a-d each include a wide variety of pallet lane lengths (e.g., a full spectrum of short pallet lanes to long pallet lanes). For example, the pallet flow rack 510d includes a shortest pallet lane of about six pallet locations, and a longest pallet lane of about 42 pallet locations (a ratio of about 1:7). It should be understood that the example pallet flow rack storage system 500 is scalable to any desired size and ratio of pallet lane lengths. In some cases, the length of the pallet lane is limited to about 50 pallet locations.

The arrangement of non-rectangular arrays of groupings of pallet flow racks 510a-d also results in creating one or more cross aisles (three cross aisles 520a, 520b, and 520c in this example). The cross aisles 520a and 520c each extend non-orthogonally and/or nonparallel in relation to the perimeter aisles 530 (and non-orthogonally and nonparallel in relation to each other). The cross aisle 520b extends orthogonally and/or parallel to the perimeter aisles 530. The three cross aisles 520a-c converge with each other and with a perimeter aisle 530.

The pallet flow rack storage system 500, with its multiple non-rectangular groups of pallet flow racks 510a-d, can have at least the following advantages over the rectangular groups of pallet flow racks as exemplified in FIGS. 2 and 3. First, the wide variety of pallet lanes of differing lengths of the pallet flow rack storage system 500 can be efficiently matched up with SKU's that have optimum inventory carrying quantities that closely correlate to the storage capacity of each pallet lane. Accordingly, the entire arrangement of the groupings of pallet flow racks 510a-d can tend to be densely filled and the warehouse space can thereby be highly utilized. Second, the cross aisles 520a-c (and the diagonal cross aisles 520a and 520c in particular) can serve to reduce the travel distances and times that are required to perform pallet stowing and pallet retrieval operations by the material handling vehicles 102.

Figure 6:
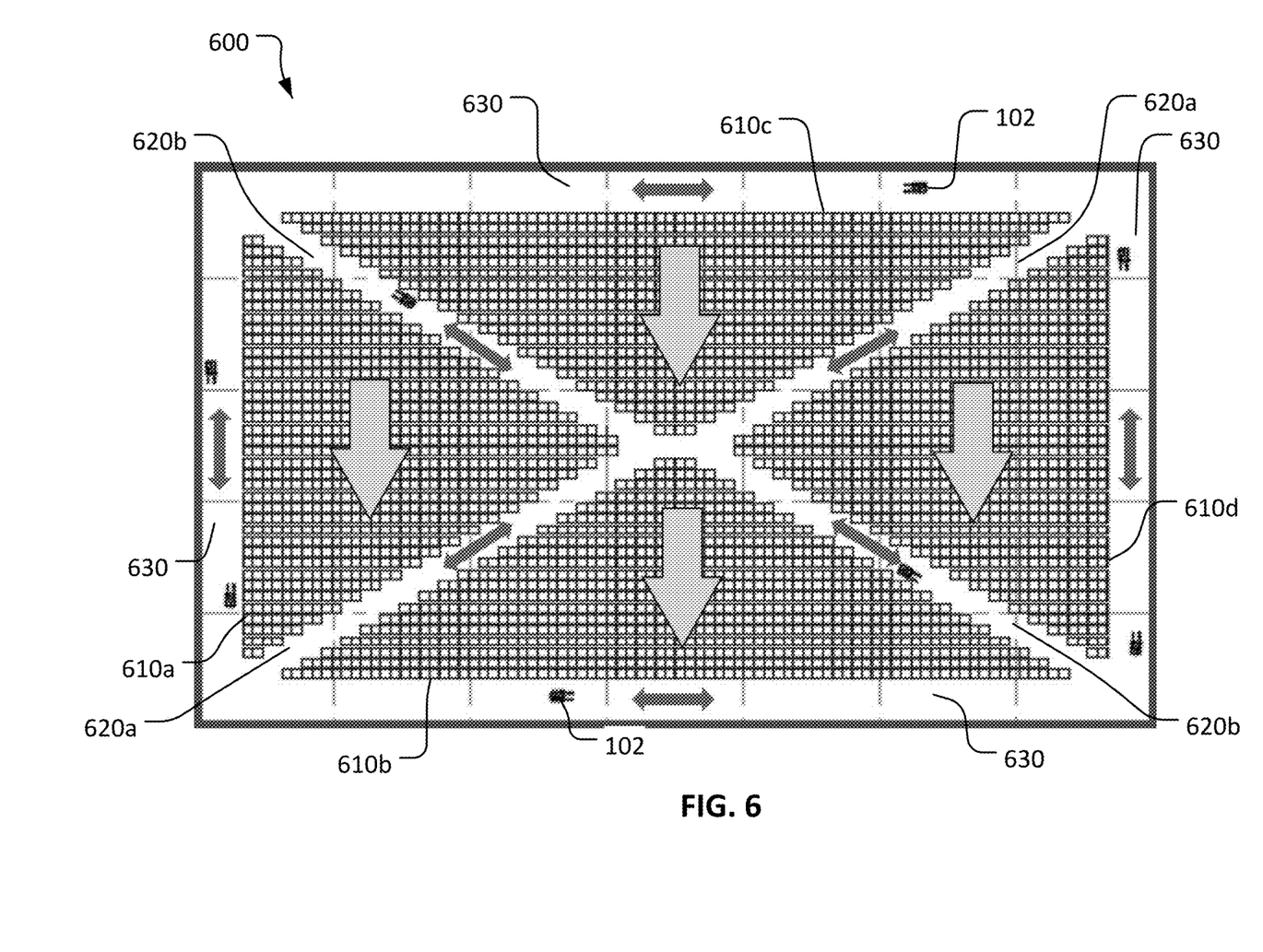
FIG. 6 is a schematic diagram showing another example arrangement of pallet flow rack in accordance with some embodiments.

FIG. 6 is a schematic plan view of another example pallet flow rack storage system 600 that can be located within a warehouse or portion of a warehouse. The pallet flow rack storage system 600 includes multiple non-rectangular groupings of pallet flow racks 610a, 610b, 610c, and 610d. In some embodiments, the groupings of pallet flow racks 610a-d have multiple vertical levels of pallet storage. The groupings of pallet flow racks 610a-d each have multiple lanes that flow from top to bottom in the depicted example.

Instead of being arranged in one or more rectangular groups like pallet flow racks 210 and 310a-d, the groupings of pallet flow racks 610a-d are essentially arranged as triangular arrays. Accordingly, the groupings of pallet flow racks 610a-d each include a wide variety of pallet lane lengths (e.g., a full spectrum of short pallet lanes to long pallet lanes). For example, the groupings of pallet flow racks 610b and 610c include a shortest pallet lane of about one pallet location, and a longest pallet lane of about 20 pallet locations (a ratio of about 1:20). It should be understood that the example pallet flow rack storage system 600 is scalable to any desired size and ratio of pallet lane lengths.

The arrangement of non-rectangular groups of pallet flow racks 610a-d also results in creating one or more cross aisles (two cross aisles 620a and 620b in this example). The cross aisles 620a and 620b each extend non-orthogonally and/or nonparallel in relation to the perimeter aisles 630 (and non-orthogonally and nonparallel in relation to each other). The two cross aisles 620a and 620b converge with each other, and crisscross each other, in a center of the groupings of pallet flow racks 610a-d.

The pallet flow rack storage system 600, with its multiple non-rectangular groups of pallet flow racks 610a-d, can have at least the following advantages over the rectangular groups of pallet flow racks as exemplified in FIGS. 2 and 3. First, the wide variety of pallet lanes of differing lengths of the pallet flow rack storage system 600 can be efficiently matched up with SKU's that have optimum inventory carrying quantities that closely correlate to the storage capacity of each pallet lane. Accordingly, the entire arrangement of the groupings of pallet flow racks 610a-d can tend to be densely filled and the warehouse space can thereby be highly utilized. Second, the diagonal cross aisles 620a and 620b can serve to reduce the travel distances and times that are required to perform pallet stowing and pallet retrieval operations by the material handling vehicles 102.

Figure 7:
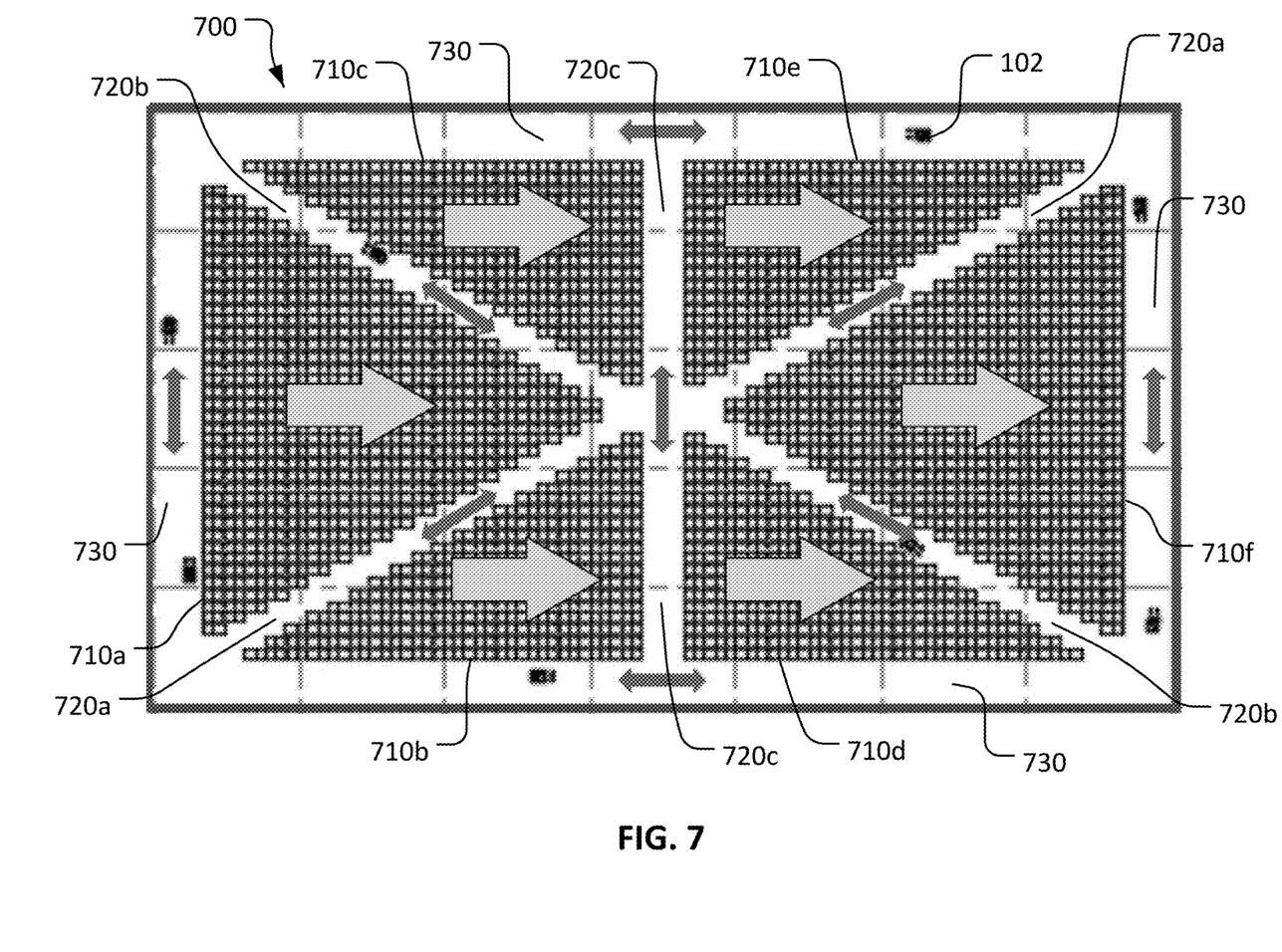
FIG. 7 is a schematic diagram showing another example arrangement of pallet flow rack in accordance with some embodiments.

FIG. 7 is a schematic plan view of another example pallet flow rack storage system 700 that can be located within a warehouse or portion of a warehouse. The pallet flow rack storage system 700 includes multiple non-rectangular groups of pallet flow racks 710a, 710b, 710c, 710d, 710e, and 710f. In some embodiments, the groupings of pallet flow racks 710a-f have multiple vertical levels of pallet storage. The groupings of pallet flow racks 710a-f each have multiple lanes that flow from left to right in the depicted example.

Instead of being arranged in one or more rectangular groups like pallet flow racks 210 and 310a-d, the groupings of pallet flow racks 710a-f are each essentially arranged as triangular arrays. Accordingly, the groupings of pallet flow racks 710a-f each include a wide variety of pallet lane lengths (e.g., a full spectrum of short pallet lanes to long pallet lanes). For example, the pallet flow rack 710a includes a shortest pallet lane of about two pallet locations, and a longest pallet lane of about 38 pallet locations (a ratio of about 1:19). It should be understood that the example pallet flow rack storage system 700 is scalable to any desired size and ratio of pallet lane lengths.

The arrangement of non-rectangular arrays of groupings of pallet flow racks 710a-f also results in creating one or more cross aisles (three cross aisles 720a, 720b, and 720c in this example). The cross aisles 720a and 720b each extend non-orthogonally and/or nonparallel in relation to the perimeter aisles 730 (and non-orthogonally and nonparallel in relation to each other). The cross aisle 720c extends orthogonally and/or parallel to the perimeter aisles 730. The three cross aisles 720a-c converge with each other, and crisscross each other, in a center of the groupings of pallet flow racks 710a-f.

The pallet flow rack storage system 700, with its multiple non-rectangular groups of pallet flow racks 710a-f, can have at least the following advantages over the rectangular groups of pallet flow racks as exemplified in FIGS. 2 and 3. First, the wide variety of pallet lanes of differing lengths of the pallet flow rack storage system 700 can be efficiently matched up with SKU's that have optimum inventory carrying quantities that closely correlate to the storage capacity of each pallet lane. Accordingly, the entire arrangement of the groupings of pallet flow racks 710a-f can tend to be densely filled and the warehouse space can thereby be highly utilized. Second, the cross aisles 720a-c (and the diagonal cross aisles 720a and 720b in particular) can serve to reduce the travel distances and times that are required to perform pallet stowing and pallet retrieval operations by the material handling vehicles 102.

ADDITIONAL OPTIONAL FEATURES AND EMBODIMENTS

While the arrangements or groups of pallet flow racks described above are all depicted as having the same pallet flow directions, it should be understood that one or more portions of the pallet flow rack arrangements can have a pallet flow in any other desired direction that is different than the other portion(s) of the pallet flow rack arrangement (e.g., right-to-left instead of left-to-right, upward, or downward). Such multiple differing pallet flow directions can be combined in a single pallet flow rack storage system. In one such non-limiting example for illustration purposes, the example pallet flow rack storage system 400 can be altered so that: (i) the group of pallet flow racks 410a flow left-to-right, (ii) the group of pallet flow racks 410b flow upward or downward, and (iii) the group of pallet flow racks 410c flow right-to-left. Any and all other combinations of directions are encompassed in the scope of this disclosure.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A pallet flow rack storage system comprising two or more groups of pallet flow racks, a perimeter of a first group of pallet flow racks of the two or more groups of pallet flow racks having a non-rectangular shape, wherein the two or more groups of pallet flow racks are separated from each other by one or more fork lift travel aisles.

2. The pallet flow rack storage system of claim 1, wherein the non-rectangular shape is trapezoidal.

3. The pallet flow rack storage system of claim 1, wherein the non-rectangular shape is triangular.

4. The pallet flow rack storage system of claim 1, wherein an overall outer perimeter of the two or more groups of pallet flow racks in combination is a rectangular shape.

5. The pallet flow rack storage system of claim 4, wherein a first fork lift travel aisle of the one or more fork lift travel aisles extends nonparallel and non-orthogonal to the rectangular shape of the overall outer perimeter.

6. The pallet flow rack storage system of claim 5, wherein a second fork lift travel aisle of the one or more fork lift travel aisles extends nonparallel and non-orthogonal to the rectangular shape of the overall outer perimeter.

7. The pallet flow rack storage system of claim 1, wherein a perimeter of a second group of pallet flow racks of the two or more groups of pallet flow racks has a non-rectangular shape.

8. The pallet flow rack storage system of claim 7, wherein a perimeter of a third group of pallet flow racks of the two or more groups of pallet flow racks has a non-rectangular shape.

9. The pallet flow rack storage system of claim 8, wherein a perimeter of a fourth group of pallet flow racks of the two or more groups of pallet flow racks has a non-rectangular shape.

10. The pallet flow rack storage system of claim 9, wherein the perimeter of each of the first, second, third, and fourth groups is triangular.

11. The pallet flow rack storage system of claim 10, wherein two cross aisles are defined between the first, second, third, and fourth groups, and wherein each of the two cross aisles extends nonparallel and non-orthogonal to a rectangular shape of the overall outer perimeter of the first, second, third, and fourth groups in combination.

12. The pallet flow rack storage system of claim 11, wherein a third cross aisle is defined between the first, second, third, and fourth groups, and wherein the third cross aisle extends parallel and orthogonal to the rectangular shape of the overall outer perimeter of the first, second, third, and fourth groups in combination.

13. A method of storing multiple types of materials in a pallet flow rack storage system, wherein the pallet flow rack storage system comprises two or more groups of pallet flow racks, a perimeter of a first group of pallet flow racks of the two or more groups of pallet flow racks having a first non-rectangular shape, and wherein the method comprises:
   storing a first type of material in a first pallet lane of the first group of pallet flow racks; and
   storing a second type of material in a second pallet lane of the first group of pallet flow racks that is longer than the first pallet lane, wherein a pallet flow direction of the first group of pallet flow racks differs from a pallet flow direction of at least one other group of pallet flow racks of the two or more groups of pallet flow racks.

14. The method of claim 13, wherein storage volume requirements of the second type of material are greater than storage volume requirements of the first type of material.

15. The method of claim 13, wherein a perimeter of a second group of pallet flow racks of the two or more groups of pallet flow racks has a second non-rectangular shape.

16. The method of claim 15, wherein the first non-rectangular shape differs from the second non-rectangular shape.

17. The method of claim 16, wherein the first non-rectangular shape is a triangle and the second non-rectangular shape is a quadrilateral.

18. The method of claim 17, wherein the first and second groups of pallet flow racks have a same flow direction.

19. The method of claim 17, wherein the first and second groups of pallet flow racks have differing flow directions.

* * * * *